(12) United States Patent
Takahara

(10) Patent No.: US 6,267,436 B1
(45) Date of Patent: Jul. 31, 2001

(54) IMPACT ENERGY ABSORBING STRUCTURE IN UPPER VEHICLE BODY PORTION, AND IMPACT ENERGY ABSORBING COMPONENT

(75) Inventor: Isamu Takahara, Nagoya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/305,102

(22) Filed: May 4, 1999

(30) Foreign Application Priority Data

Jul. 22, 1998 (JP) .................................................. 10-205982
Nov. 25, 1998 (JP) .................................................. 10-333885

(51) Int. Cl.$^7$ ............................. B60R 21/00; B60R 21/02
(52) U.S. Cl. ...................... 296/188; 296/205; 296/203.02
(58) Field of Search ............................... 296/203.03, 205, 296/188, 189, 187, 203.02, 39.1; 280/748, 751

(56) References Cited

U.S. PATENT DOCUMENTS

| | | |
|---|---|---|
| 3,904,223 | 9/1975 | Wilfert et al. . |
| 4,007,242 * | 2/1977 | Lorge et al. ............................. 264/89 |
| 4,355,844 * | 10/1982 | Fantini Muzzarelli ............... 296/205 |
| 5,163,730 | 11/1992 | Welch . |
| 5,232,261 * | 8/1993 | Kuroda et al. ........................ 296/188 |
| 5,404,690 * | 4/1995 | Hanf ...................................... 296/189 |
| 5,560,672 * | 10/1996 | Lim et al. .............................. 296/189 |
| 5,577,796 * | 11/1996 | Clausen ................................. 296/205 |
| 5,580,120 * | 12/1996 | Nees et al. ............................ 296/188 |
| 5,660,426 | 8/1997 | Sugimori et al. . |
| 5,680,886 | 10/1997 | Ohtsuka . |
| 5,839,777 * | 11/1998 | Vlahovic ............................... 296/205 |
| 5,868,457 * | 2/1999 | Kitagawa ............................... 296/188 |
| 5,913,565 * | 6/1999 | Watanabe ......................... 296/203.02 |
| 6,099,071 * | 8/2000 | Kasuga et al. ........................ 296/205 |
| 6,145,271 * | 11/2000 | Kossmeier et al. ................... 296/188 |

FOREIGN PATENT DOCUMENTS 7-61304   3/1995  (JP) .

* cited by examiner

Primary Examiner—D. Glenn Dayoan
Assistant Examiner—Hilary Gutman
(74) Attorney, Agent, or Firm—Oliff & Berridge, PLC

(57) ABSTRACT

A structure absorbs impact energy in an upper vehicle body portion provided with a vehicle structural member and an interior trim spaced inward from the structural member. The structure includes an energy absorbing member disposed in the interval between the structural member and the interior trim and extending along the structural member. The energy absorbing member may be a hybrid pipe including a core member formed from a metal foil, and sheets of a different material laminated on opposite surfaces of the core member. The hybrid pipe may be twisted about its longitudinal axis, and/or a shape of a cross section of the hybrid pipe may gradually change in a direction of the longitudinal axis.

4 Claims, 14 Drawing Sheets

←FORWARD

IMPACT ENERGY ABSORBING STRUCTURE IN UPPER VEHICLE BODY PORTION, AND IMPACT ENERGY ABSORBING COMPONENT

INCORPORATION BY REFERENCE

The disclosures of the following priority application(s) are herein incorporated by reference:

The disclosures of Japanese Patent Application Nos. HEI 10-205982 filed on Jul. 22, 1998, and HEI 10-333885 filed on Nov. 25, 1998, including the specifications, drawings and abstracts, are incorporated herein by reference in their entirety.

BACKGROUND OF THE INVENTION

1. Field of Invention

The present invention relates to an impact energy absorbing structure formed in an upper portion of a body of a motor vehicle, and to an impact energy absorbing component. More particularly, the invention relates to an impact energy absorbing structure formed in an upper vehicle body portion including a vehicle body structural member, such as a pillar, a roof side rail, a header or the like, and an interior trim, such as a pillar garnish, a roof lining or the like, that is spaced from the structural member by an interval extending toward the interior of a passenger compartment, wherein an energy absorbing member is disposed within the interval, and also relates to an impact energy absorbing component for use in the impact energy absorbing structure.

2. Description of Related Art

In motor vehicles, particularly, in passenger cars, an energy absorbing member is disposed in a space between an interior trim and a structural member of a vehicle body. Therefore, if an impact load is applied in a direction from the interior trim to the structural member, the energy absorbing member deforms to absorb energy of the impact load. Normally employed energy absorbing members are, for example, a grid rib member, a urethane pad, a steel member formed by bending a thin steel sheet so as to have a hat-like sectional shape, and the like. Also employed as an energy absorbing member is a generally-termed hybrid pipe (as described in U.S. Pat. No. 5,680,886) that is made up of a metal foil core member and sheets of a material other than metal that are laid on opposite side surfaces of the core member. In the hybrid pipe, the core member and the sheets on the opposite side surfaces of the core member are corrugated so that ridges and grooves alternate in a direction of a longitudinal axis of the pipe.

A hybrid pipe, after being formed, can easily be changed into a desired sectional shape by correspondingly shaping the pipe. Furthermore, the energy absorption characteristics of a hybrid pipe can be adjusted by changing a thickness of the hybrid pipe measured between an outermost point in the curved outer surface of a ridge or protruded portion and an innermost point in the curved inner surface of a groove or recessed portion, that is, the generally-termed apparent plate thickness of the hybrid pipe, or by changing the pitch between adjacent protruded portions (or recessed portions), or the like. Thus, a hollow-shaped energy absorbing member represented by a hybrid pipe or the like has good properties desirable for an energy absorbing member.

Vehicle body structural members to be installed at certain locations in a vehicle body are formed into three-dimensionally bent shapes in order to meet strength and design requirements. In some locations, therefore, it is difficult to dispose an energy absorbing member so as to extend precisely conforming to the shape of an adjacent structural member. Interior trims are normally formed mainly to meet design needs, and the need to conform an interior trim to a local shape of an adjacent structural member is rather minor. Therefore, if a hybrid pipe or a different hollow pipe is disposed in an interval between a structural member and an interior trim, there may be a gap formed between the structural member and the energy absorbing member or between the energy absorbing member and the interior trim, the gap extending in directions of the length of the structural member and varying in size with progress in those lengthwise directions.

An energy absorbing member preferably starts deforming during an initial period following occurrence of an impact load, and absorbs a designed amount of energy as it is displaced to a predetermined amount of displacement. However, if there is a gap between the energy absorbing member and an interior trim or a structural member, the energy absorbing member does not deform until the gap is eliminated. The aforementioned predetermined amount of displacement of an energy absorbing member means an amount of displacement to which the energy absorbing member can be displaced while being deformed by an impact load. The predetermined amount of displacement is substantially constant. Therefore, if there is a gap between the energy absorbing member and the structural member or the interior trim, an impact load will move the energy absorbing member to an amount of displacement corresponding to the size of the gap without deforming the energy absorbing member, so that the effective displacement of the energy absorbing member caused by the impact load decreases and the amount of energy absorbed correspondingly decreases. Thus, if a gap exists between an energy absorbing member and an interior trim or a structural member, and the size of the gap varies in directions of length of the structural member, the amount of energy absorbed becomes likely to greatly vary depending on the site of impact load.

SUMMARY OF THE INVENTION

Accordingly, it is an object of the present invention to provide an impact energy absorbing structure in an upper vehicle body portion that makes full use of the excellent properties of a hollow member, such as a hybrid pipe, and actually accomplishes energy absorption as designed.

It is another object of the invention to provide an impact energy absorbing component for use in an impact energy absorbing structure.

In accordance with a first aspect of the invention, an impact energy absorbing structure in an upper vehicle body portion includes a vehicle body structural member extending in a lengthwise direction, an interior trim spaced from the structural member by an interval extending inwardly from the structural member, and an energy absorbing member disposed in the interval between the interior trim and the structural member and extending along the structural member in the lengthwise direction. The energy absorbing member is formed so that a section of the energy absorbing member taken on an imaginary plane perpendicular to the lengthwise direction has a substantially uniform shape along the lengthwise direction. The impact energy absorbing structure further includes a spacer filling a gap that is formed at least either between the energy absorbing member and the structural member or between the energy absorbing member and the interior trim, at a first location along the vertical structural member.

In this impact energy absorbing structure, the energy absorbing member and the spacer are disposed in the interval between the structural member and the interior trim. The spacer may be formed in accordance with the size of the gap that is formed at least either between the energy absorbing member and the structural member or between the energy absorbing member and the interior trim, at a first location along the vertical structural member. Since the spacer substantially fills the gap, the energy absorbing member starts to undergo compression deformation substantially immediately when an impact load occurs in a direction from the interior trim to the structural member.

The spacer substantially filling the gaps makes it possible for the energy absorbing member to immediately start compression deformation and thereby absorb energy upon application of an impact load. If there is a gap, substantial energy absorption does not start until the interior trim or the energy absorbing member is displaced to fill the gap. This displacement is useless in terms of energy absorption. However, in the impact energy absorbing structure of the invention, such a useless displacement does not occur. That is, in the invention, the energy absorbing member can undergo compression deformation over the entire designed displacement upon an impact, and the amount of energy absorbable by the energy absorbing member can be made substantially consistent over the entire length of the structural member.

Furthermore, since the energy absorbing member is formed so that the cross sectional shape thereof is substantially uniform, there is no cumbersome or complicated operation required in production of the energy absorbing member. Moreover, the shape of the energy absorbing member can be simplified by selecting a suitable shape of the spacer, so that the production of the energy absorbing member is further facilitated. Further, the employment of a hollow energy absorbing member reduces the dependency of the energy absorption characteristics on the direction of an impact load on the energy absorbing member, and allows easy adjustment of the energy absorption characteristics thereof by changing the plate thickness, the apparent plate thickness or the twist pitch of the energy absorbing member.

The spacer may fill the gap between the energy absorbing member and the interior trim. For this arrangement, the spacer may be a resin-made ribbed arrangement which is provided integrally with a reverse surface of the interior trim that faces the energy absorbing member, and which is capable of absorbing energy.

In this structure, the spacer is provided integrally with the reverse surface of the interior trim, so that the step of forming the spacer as a separate member is omitted and the number of component parts required is decreased. Furthermore, since the spacer is a resin-made ribbed arrangement, it becomes possible to adjust the energy absorption characteristics of the energy absorbing member by selecting a plate thickness of the ribbed arrangement, a layout thereof, a length thereof, or the like.

The spacer may also be one of a resin-made ribbed arrangement and a foamed member, provided integrally with the energy absorbing member and capable of absorbing energy.

Therefore, the layout of the spacer can be completed merely by disposing, at a predetermined position, the energy absorbing member provided integrally with a resin-made ribbed arrangement or a foamed member, such as a urethane foam member, so that the step of mounting the spacer is omitted. Since the spacer is prepared as a component part separate from the energy absorbing member and the interior trim, the material and shape of the spacer can be freely selected. Therefore, the adjustment of the energy absorption characteristics of the energy absorbing member is further facilitated.

In the first aspect of the invention, the energy absorbing member may be an extruded metal pipe.

Therefore, the energy absorbing member can be formed into a predetermined shape by extrusion, so that productivity improves. The employment of a metal pipe as the energy absorbing member achieves a load-displacement energy absorption characteristic with sharp rising of load.

In the first aspect of the invention, the energy absorbing member may alternatively be a hybrid pipe having a core member formed from a metal foil and sheets laminated on opposite surfaces of the core member, each of the sheets being formed from a material other than metal. In the hybrid pipe, the core member and the sheets are shaped so that the hybrid pipe has protruded portions and recessed portions that are contiguous in a direction of a longitudinal axis of the hybrid pipe.

Being a hybrid pipe, the energy absorbing member becomes a light-weight member. A hybrid pipe can be formed by, for example, winding the core member and the sheets around a spindle, and serially forming protruded and recessed portions, so that high productivity can be achieved. Since a hybrid pipe can be relatively freely bent or shaped, it becomes easy to dispose the energy absorbing member so as to follow the shape of a structural member or an interior trim.

In accordance with a second aspect of the invention, an impact energy absorbing component includes an energy absorbing member formed by one of an extruded metal pipe and a hybrid pipe having a core member formed from a metal foil, and sheets laminated on opposite surfaces of the core member. Each of the sheets is formed from a material other than metal, and the core member and the sheets are shaped so that the hybrid pipe has protruded portions and recessed portions that are contiguous in a direction of a longitudinal axis of the hybrid pipe. The energy absorbing member is formed so that a sectional shape of the energy absorbing member taken on an imaginary plane perpendicular to a longitudinal axis of the energy absorbing member is substantially uniform in a direction of the longitudinal axis. The impact energy absorbing component further includes a spacer disposed at a predetermined position on the energy absorbing member.

If the energy absorbing member and the spacer are disposed at a predetermined position and suitably fastened, an impact energy absorbing structure is formed. The energy absorbing and the spacer may be separately prepared, and separately transported to a location where an impact energy absorbing structure is needed, and separately fastened at that location. It is also possible to couple the energy absorbing member and the spacer beforehand so that the spacer assumes a predetermined position relative to the energy absorbing member, and transport the thus-formed component to a location where an impact energy absorbing structure is needed, fasten the component at that location.

Since the cross sectional shape of the energy absorbing member is substantially uniform, the energy absorbing member can be efficiently produced. By disposing and fastening the energy absorbing member and the spacer at a predetermined position, an impact energy absorbing structure can easily be formed. The impact energy absorbing component is made up of the energy member and the spacer. Therefore, in a case where the energy absorbing member and the spacer are separately prepared, separately transported to a location where an impact energy absorbing structure is to be formed, and fastened at that location, the impact energy absorbing component can easily be disposed by adjusting the relative positions of the energy absorbing member and the spacer, even if the interval between the structural member and the interior trim varies.

In accordance with a third aspect of the invention, an impact energy absorbing structure in an upper vehicle body portion includes a vehicle body structural member extending in a lengthwise direction, an interior trim spaced from the structural member by an interval extending inwardly from the structural member, and an energy absorbing member disposed in the interval between the interior trim and the structural member and extending along the structural member in the lengthwise direction. The energy absorbing member is a hybrid pipe having a core member formed from a metal foil and sheets laminated on opposite surfaces of the core member, each of the sheets being formed from a material other than metal. The core member and the sheets are shaped so that the hybrid pipe has protruded portions and recessed portions that are contiguous in a direction of a longitudinal axis of the hybrid pipe. The hybrid pipe is formed so that a length of an outer periphery of a section of the hybrid pipe taken on an imaginary plane perpendicular to the longitudinal axis of the hybrid pipe is substantially consistent in the direction of the axis while a shape of the section of the hybrid pipe gradually changes in the direction of the axis.

The hybrid pipe is gradually shaped in such a manner that the cross sectional shape thereof gradually changes in the direction of the axis so that there is substantially no gap formed between the hybrid pipe and the structural member or between the hybrid pipe and the interior trim. Therefore, if the thus-shaped hybrid pipe is disposed at a predetermined position, substantially no gap is formed between the hybrid pipe and the structural member or between the hybrid pipe and the interior trim.

If an impact load occurs in a direction from the interior trim toward the structural member, the hybrid pipe starts to undergo compression deformation and perform energy absorption in an early period following the occurrence of the impact load. Therefore, impact energy can be efficiently absorbed.

In a case where, for energy absorption, a plurality of hybrid pipes having different sectional shapes but each having a uniform sectional shape are serially disposed adjacent to one another in the direction of length of a structural member, the energy absorption characteristics become discontinuous in the directions of length of the structural member because of gaps formed between adjacent hybrid pipes and the different sectional shapes of the hybrid pipes. However, in the invention, the hybrid pipe has a continuous configuration and is capable of reducing or curbing a sharp change in the sectional shape, so that continuous energy absorption characteristics can be achieved. That is, the impact energy absorption characteristics at a given site in a direction of length of the structural member does not greatly differ from those at different sites. Thus, approximately consistent impact energy absorption characteristics in the direction of length of the structural member can be achieved.

The hybrid pipe is formed so that while the length of the outer periphery of a section of the hybrid pipe taken on an imaginary plane perpendicular to the longitudinal axis of the hybrid pipe is substantially consistent in the direction of the longitudinal axis, the shape of the section of the hybrid pipe gradually changes in the direction of the longitudinal axis. Therefore, a hybrid pipe with a maximum cross section can be provided, and a hybrid pipe whose cross sectional shape gradually changes can easily be produced.

The hybrid pipe may be twisted about the longitudinal axis thereof.

The hybrid pipe, upon receiving an impact in a direction intersecting the longitudinal axis of the hybrid pipe, elongates in the direction of the longitudinal axis, so the apparent plate thickness thereof changes and the energy absorption characteristics change. If the hybrid pipe is twisted about the longitudinal axis thereof, the internal resistance or viscosity resistance against elongation in the direction of the longitudinal axis increases, so that an energy absorption characteristic with a sharp rising of load will be achieved. As a result, great amounts of impact energy can be absorbed with small amounts of effective displacement.

In accordance with a fourth aspect of the invention, an impact energy absorbing structure includes a center pillar supporting, at an intermediate portion thereof in a front-rear direction with respect to a vehicle body, a rail that supports a shoulder belt adjuster support movably in the up-down direction, a pillar garnish spaced from the center pillar by an interval extending inward from the center pillar, and an energy absorbing member disposed in the interval and extending along the center pillar in the up-down direction. The energy absorbing member is a hybrid pipe having a core member formed from a metal foil, and sheets laminated on opposite surfaces of the core member, each of the sheets being formed from a material other than metal. The core member and the sheets are shaped so that the hybrid pipe has protruded portions and recessed portions that are contiguous in a direction of a longitudinal axis of the hybrid pipe. The hybrid pipe has a pair of hollow energy absorbing portions that are connected to each other and that are disposed forward and rearward of the rail.

Since the center pillar is likely to receive an impact load in either one of the front-rear directions with respect to the vehicle body, it is a normal practice to dispose and fasten two energy absorbing members forward and rearward of the rail supporting the adjuster support. In this aspect of the invention, a single energy absorbing member having two energy absorbing portions is disposed, so that the operability in assembly improves and the number of component parts required is reduced.

In accordance with a fifth aspect of the invention, an impact energy absorbing component includes a hybrid pipe having a core member formed from a metal foil, and sheets laminated on opposite surfaces of the core member, each of the sheets being formed from a material other than metal. The core member and the sheets are shaped so that the hybrid pipe has protruded portions and recessed portions that are contiguous in a direction of a longitudinal axis of the hybrid pipe. The hybrid pipe is formed so that a length of an outer periphery of a section of the hybrid pipe taken on an imaginary plane perpendicular to the longitudinal axis of the hybrid pipe is substantially consistent in the direction of the axis, while a shape of the section of the hybrid pipe gradually changes in the direction of the longitudinal axis.

If the impact energy absorbing component including the hybrid pipe formed so that the length of the outer periphery of a section of the hybrid pipe taken on an imaginary plane perpendicular to the longitudinal axis of the hybrid pipe is substantially consistent in the direction of the longitudinal axis while the shape of the section of the hybrid pipe gradually changes in the direction of the longitudinal axis is disposed at a predetermined position and suitably fastened, an impact energy absorbing structure is formed.

The aforementioned hybrid pipe is formed so as to have a desired sectional shape by changing the sectional shape of a hybrid pipe having a circular sectional shape and therefore a maximum sectional area, that is, a cylindrical hybrid pipe, through a forming process. The thus-formed hybrid pipe is used to form the impact energy absorbing component. Therefore, the impact energy absorbing component can easily be produced.

BRIEF DESCRIPTION OF THE DRAWINGS

The foregoing and further objects, features and advantages of the present invention will become apparent from the following description of preferred embodiments with reference to the accompanying drawings, wherein like numerals are used to represent like elements and wherein.

DETAILED DESCRIPTION OF PREFERRED EMBODIMENTS

Preferred embodiments of the present invention will be described in detail hereinafter with reference to the accompanying drawings.

Figure 1:
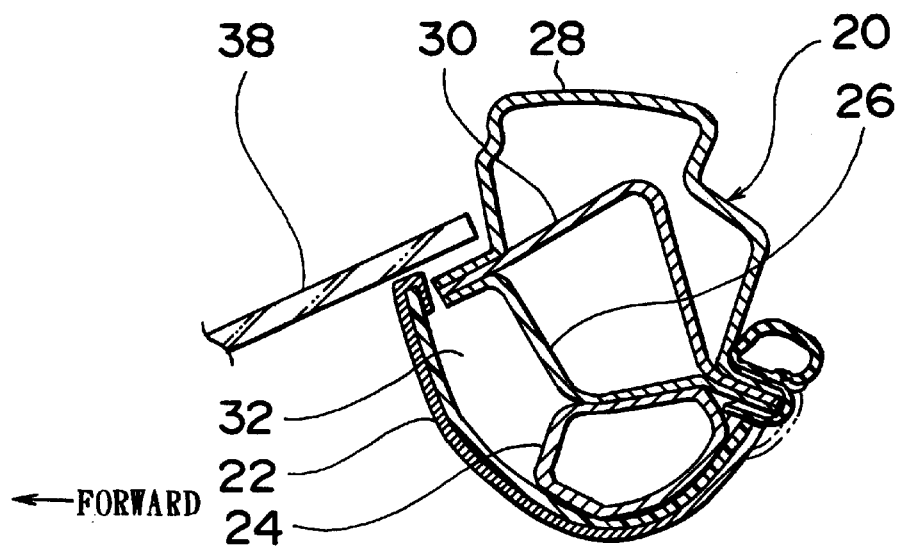
FIG. 1 is an enlarged sectional view of an embodiment of the impact energy absorbing structure in an upper vehicle body portion of the invention, taken on line I—I in FIG. 3.
Figure 2:
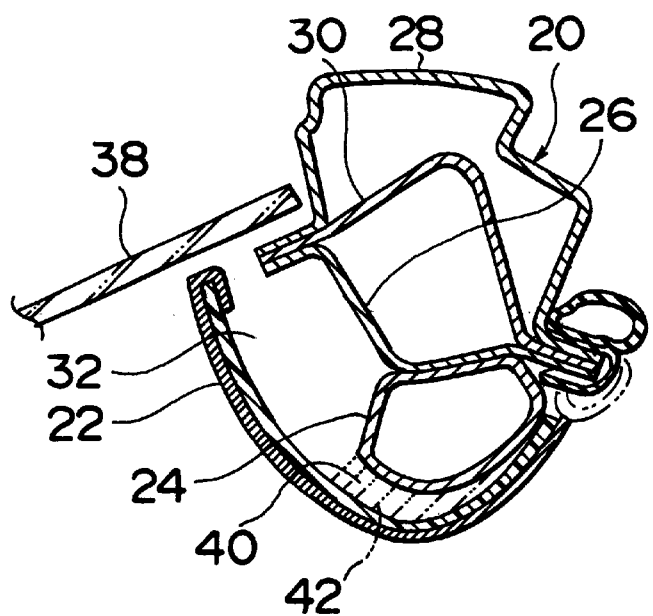
FIG. 2 is an enlarged sectional view taken on line II—II in FIG. 3.
Figure 3:
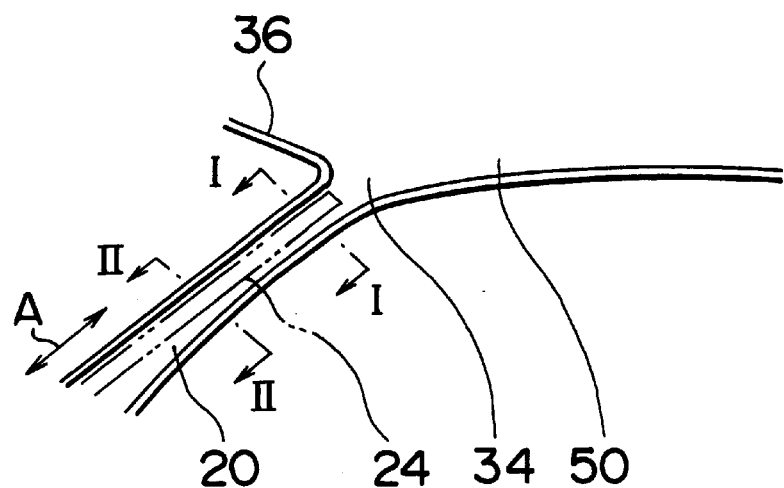
FIG. 3 is a schematic illustration of a portion of a vehicle body to which the impact energy absorbing structure in an upper vehicle body portion of invention is applicable.

Referring to the sectional views in FIGS. 1 and 2 and the schematic illustration in FIG. 3, an impact energy absorbing structure formed in an upper vehicle body portion according to one embodiment includes an elongated vehicle body structural member 20 extending in directions A, an interior trim 22 spaced inwardly from the structural member 20, and an energy absorbing member 24 disposed in an interval 32 between the structural member 20 and the interior trim 22. The impact energy absorbing structure is thus formed so as to absorb impact energy.

In the embodiment shown in FIGS. 1 through 3, the structural member 20 is a front pillar made up of an inner panel 26, an outer panel 28 and a reinforcement panel 30. Flanges of the panels are placed on top of one another and joined, so that the structural member 20 (front pillar) has a closed sectional shape. The interior trim 22 is a pillar garnish.

The energy absorbing member 24 is a hollow member disposed in an interval 32 between the inner panel 26 of the structural member 20 and the interior trim 22 and extending in the lengthwise directions A along the structural member 20. As can be seen from a comparison between FIGS. 1 and 2, the size of the interval 32 between the inner panel 26 of the structural member 20 and the interior trim 22 varies in the lengthwise directions with respect to the structural member 20, whereas the section of the energy absorbing member 24 taken on an imaginary plane perpendicular to the lengthwise direction of the structural member 20, that is, the plane of the drawing in each of FIGS. 1 and 2, is substantially uniform in shape and has such dimensions that the energy absorbing member 24 can be contained in the interval 32. That is, the sectional shape of the energy absorbing member 24 is substantially uniform in the lengthwise direction, and the section thereof has maximum dimensions that allow containment of the energy absorbing member 24 within a portion of the interval 32 that exists in impact load acting directions.

As shown in FIG. 3, the structural member 20 is connected at its upper end portion to a roof side rail 50 extending in the front-rear directions with respect to the vehicle body and a header 36 extending in the right-left directions with respect to the vehicle body. The structural member 20 is bent three-dimensionally, that is, in a direction substantially perpendicular to the plane of the drawing in FIG. 3, in addition to the two-dimensional directions that can be seen in FIG. 3. The interval 32 between the inner panel 26 of the structural member 20 and the interior trim 22 disposed inwards from the inner panel 26 becomes narrowest in a connecting portion 34 where the structural member 20, the roof side rail 50 and the header 36 are connected, as can be seen from FIGS. 1 and 3. Since the sectional shape of the energy absorbing member 24 is substantially uniform in the lengthwise direction, in order to give the section thereof maximum dimensions that allow containment of the energy absorbing member 24 within a portion of the interval 32 that exists in impact load acting directions, the energy absorbing member 24 contacts with both of the interior trim 22 and the inner panel 26 at and/or near the connecting portion 34, as shown, for example in FIG. 1.

In the embodiment shown in FIGS. 1 through 3, the energy absorbing member 24 is disposed closer to one side in the interval 32, that is, a rearward side. This is because the structural member 20 is disposed rearward of a windshield 38 and, in the vicinity of the windshield 38, impact load is unlikely to act in a direction from the interior trim 22 to the structural member 20. Therefore, optimal shape and location of the energy absorbing member 24 may be selected considering the directions of impact loads that are likely to occur at a location where the energy absorbing member 24 is to be disposed.

Since the energy absorbing member 24 has a shape as described above, a gap 40 is formed between the energy absorbing member 24 and the interior trim 22 at a site remote from the connecting portion 34, as can be seen in FIG. 2. According to the invention, the gap 40 is filled by disposing a spacer 42 therein. The spacer 42 itself may be capable or incapable of absorbing energy. The spacer 42 extends along the structural member 20 in the direction of its length. The cross section of the spacer 42 gradually reduces toward the connecting portion 34. The spacer 42 does not need to fill the entire gap. For example, a plurality of spacers 42 may be disposed serially in the lengthwise direction, with intervals left therebetween. If the inter-spacer interval is sufficiently smaller than the size of a roundish object such as a vehicle occupant's head or the like, that impacts the interior trim 22, the presence of the inter-spacer interval in the lengthwise direction does not cause a problem in energy absorption.

In a structure in which the spacer 42 itself is capable of absorbing energy, the spacer 42 may be provided as resin ribs that have been formed on a reverse surface of the interior trim 22 that faces the energy absorbing member 24, integrally with the interior trim 22. The interior trim 22 is normally formed by injection molding of a hard resin such as an acrylonitrile butadiene styrene (ABS) resin. In the process of molding the interior trim 22, resin ribs, more specifically, a plurality of longitudinal ribs and a plurality of lateral ribs suitably spaced apart from one another, can be simultaneously formed. This molding process eliminates the need to form a spacer 42 separately. In this case, the plate thickness, height and the like of the longitudinal and lateral ribs are suitably selected to adjust the load-displacement energy absorption characteristic of the energy absorbing member 24. For example, the height of the longitudinal and lateral ribs may be set to a value within the range of about 1 to 2 mm such that when an impact load occurs, the energy absorbing member 24 will first undergo compression deformation and, after the energy absorbing member 24 is sufficiently compressed, the resin ribs will buckle or shear. Therefore, an amount of energy can be absorbed by the resin ribs, in addition to the amount of energy absorbed by the energy absorbing member 24.

If the spacer 42 is incapable of absorbing energy, the displaceable amount of the energy absorbing member 24 is determined so that a so-call bottoming phenomenon by the spacer 42 is prevented. That is, it is preferred to determine a displaceable amount of the energy absorbing member 24 such that if an impact load acts on the energy absorbing member 24 via the interior trim 22 and then the spacer 42, required energy absorption is completed when the energy absorbing member 24 becomes sufficiently compressed.

In the embodiment, the gap 40 between the energy absorbing member 24 and the interior trim 22 is filled by the spacer 42. However, a gap may possibly be formed between the energy absorbing member 24 and the structural member 20, depending on the location of the energy absorbing member 24. In such a case, the gap between the energy absorbing member 24 and the structural member 20 is filled by a spacer. It is also possible to fill both a gap between the energy absorbing member 24 and the structural member 20 and a gap between the energy absorbing member 24 and the interior trim 22 by using spacers. It is also possible to fill only the larger one of the two gaps with a spacer, achieving sufficient effect.

Figure 4:
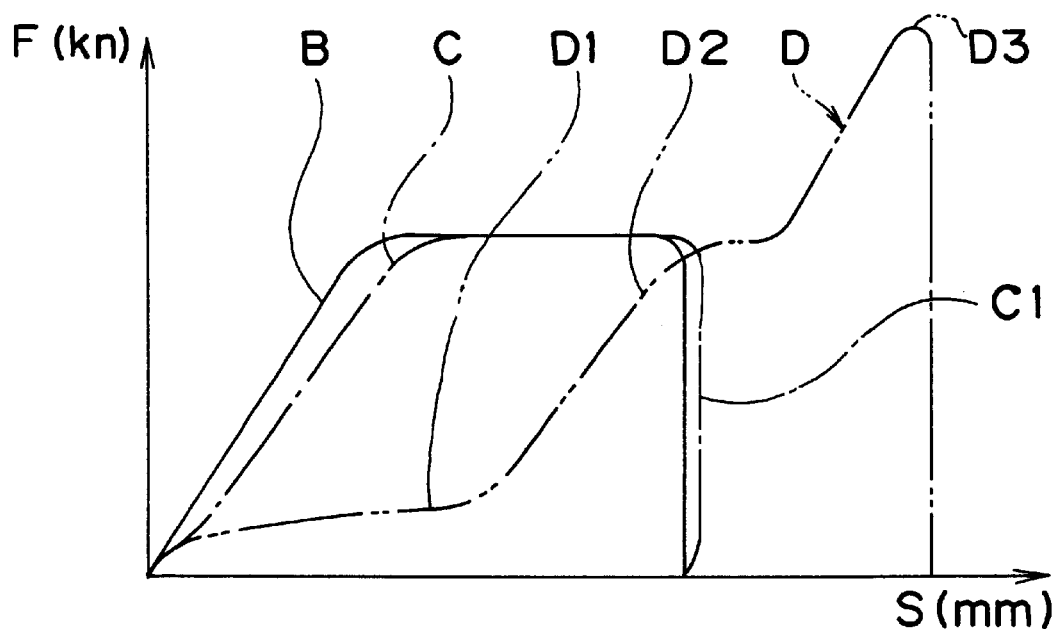
FIG. 4 is a graph indicating load-displacement energy absorption characteristics for the impact energy absorbing structure of FIGS. 1–3.

FIG. 4 is a graph indicating load(F)-displacement(S) energy absorption characteristics in various cases. If an impact load occurs at a site indicated by the sectional view in FIG. 1, the energy absorbing member 24 starts deforming during an initial period following occurrence of the impact load. Therefore, the reaction load changes as indicated by solid line B. If an impact load occurs at a site indicated by the sectional view in FIG. 2, the start of compression deformation of the energy absorbing member 24 may be slightly delayed by the effect of a small gap (not shown) that may exist between the spacer 42 and the interior trim 22 or between the spacer 42 and the energy absorbing member 24. Therefore, the reaction load changes as indicated by single-dot line C. After the energy absorbing member 24 is sufficiently compressed, the spacer, that is, the resin ribs, shear or buckle, so that the reaction load decreases as indicated by a line segment C1. If there is no spacer in the gap at the site indicated by the sectional view of FIG. 2, the reaction load changes as indicated by double-dot line D. That is, the reaction load remains small as indicated by D1 until the interior trim 22 contacts the energy absorbing member 24. When the interior trim 22 contacts the energy absorbing member 24 and the energy absorbing member 24 starts to undergo compression deformation, the reaction load increases as indicated by D2, resulting in a bottoming phenomenon as indicated by D3. The bottoming phenomenon indicates incomplete energy absorption.

Figure 5:
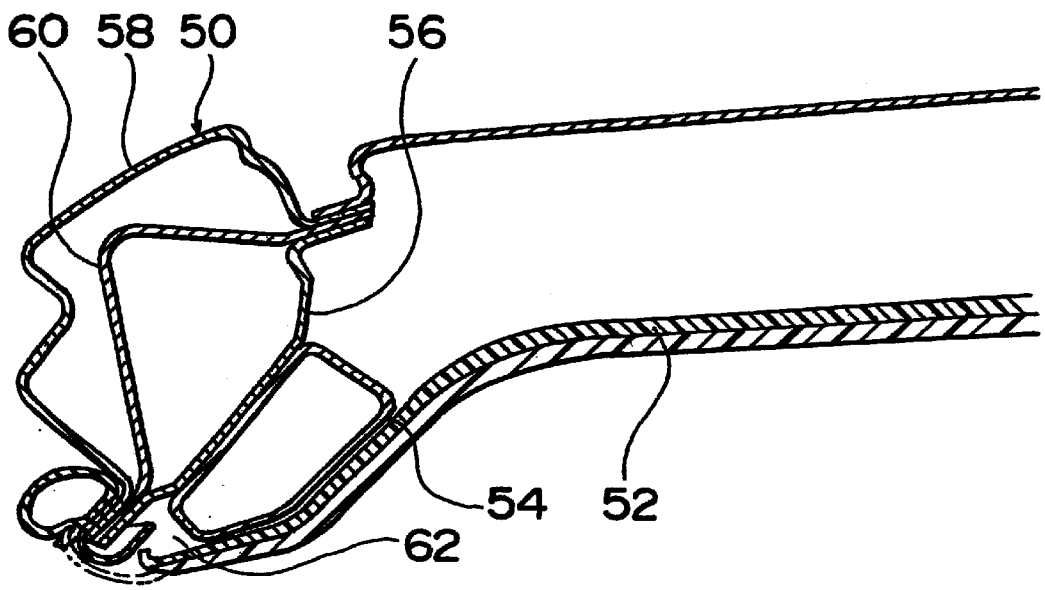
FIG. 5 is an enlarged sectional view of another embodiment of the impact energy absorbing structure in an upper vehicle body portion of the invention, taken on line V—V in FIG. 8.
Figure 6:
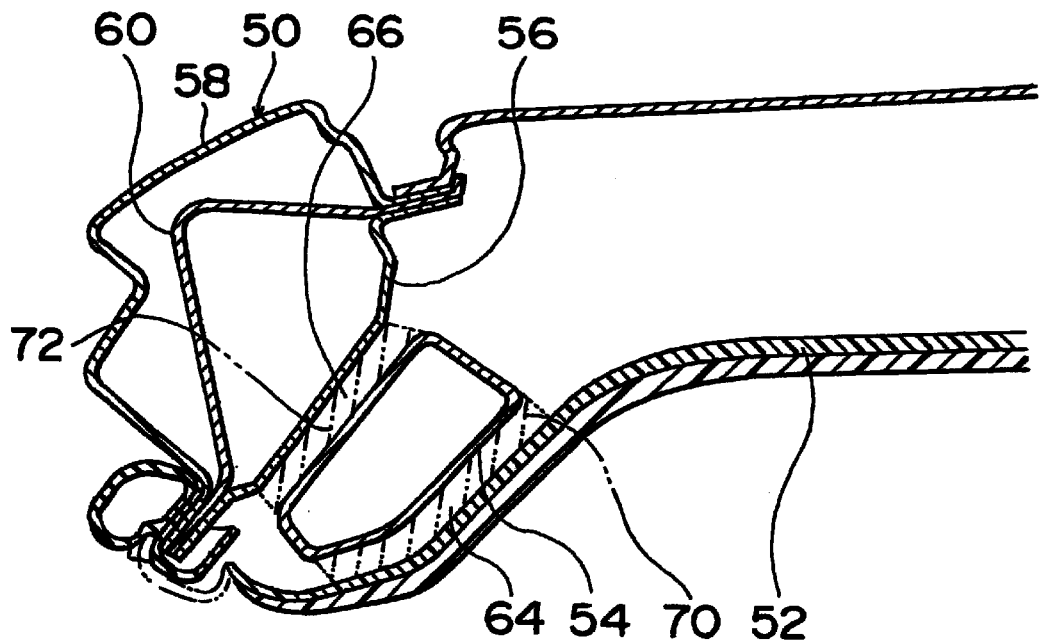
FIG. 6 is an enlarged sectional view taken on line VI—VI in FIG. 8.
Figure 7:
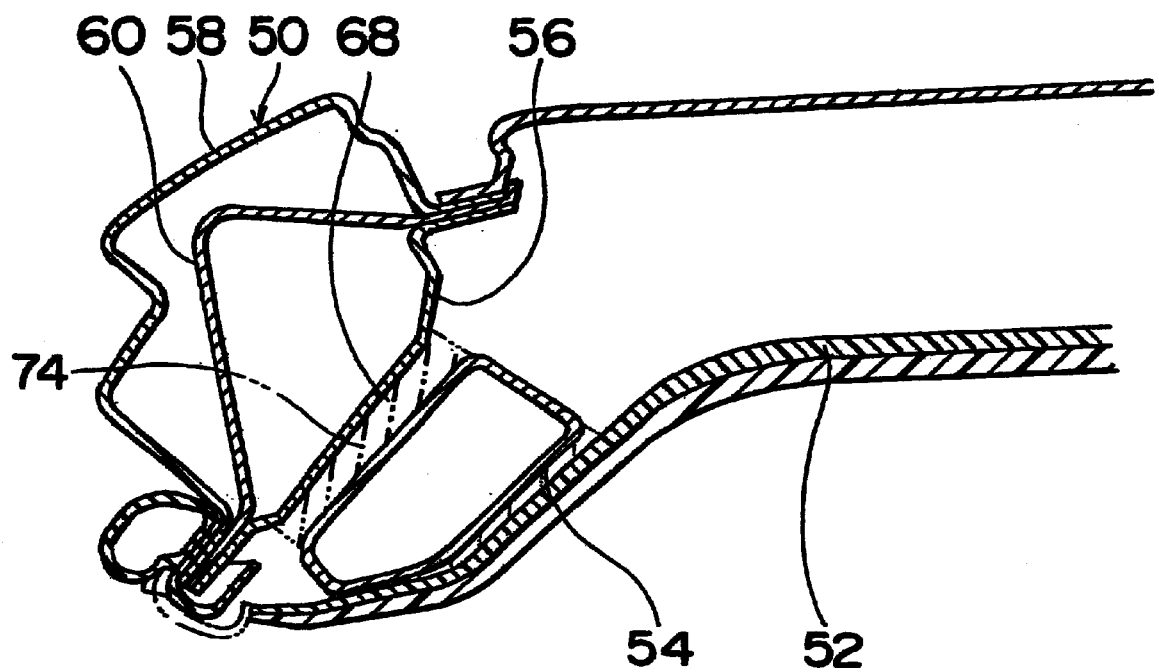
FIG. 7 is an enlarged sectional view taken on line VII—VII in FIG. 8.
Figure 8:
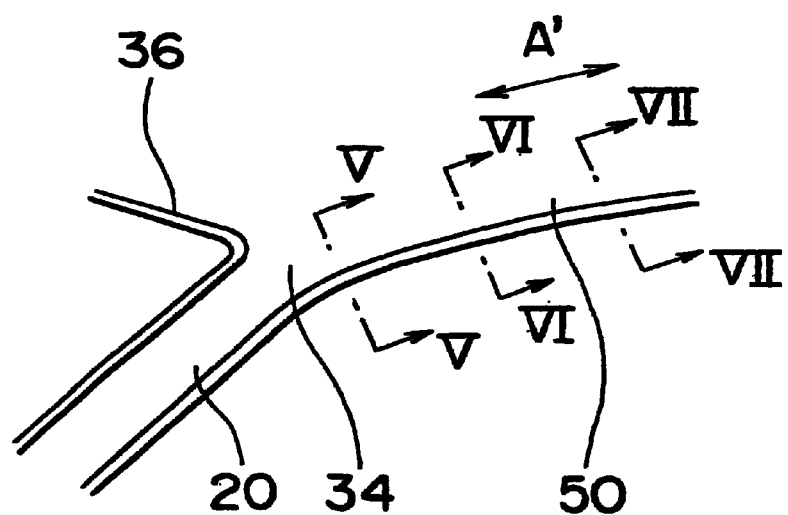
FIG. 8 is a schematic illustration of a roof side rail of a vehicle body to which the impact energy absorbing structure in an upper vehicle body portion of the invention is applicable.

Referring to the sectional views of FIGS. 5 through 7 and the schematic illustration in FIG. 8, an impact energy absorbing structure formed in an upper vehicle body portion according to another embodiment includes an elongated vehicle body structural member 50 extending in directions A', an interior trim 52 spaced inward from the structural member 50, and an energy absorbing member 54 disposed in an interval 62 between the structural member 50 and the interior trim 52. The impact energy absorbing structure is thus formed so as to absorb impact energy.

In the embodiment shown in FIGS. 5 through 8, the structural member 50 is a roof side rail made up of an inner panel 56, an outer panel 58 and a reinforcement panel 60. Flanges of the panels are placed on top of one another and joined, so that the structural member 50 (roof side rail) has a closed sectional shape. The interior trim 52 is a roof lining.

The energy absorbing member 54 is a hollow member disposed in an interval 62 between the inner panel 56 of the structural member 50 and the interior trim 52 and extending in the lengthwise directions A' along the structural member 50. As can be seen from the comparison between FIGS. 5 through 7, the size of the interval 62 between the inner panel 56 of the structural member 50 and the interior trim 52 varies in the lengthwise direction with respect to the structural member 50, whereas the section of the energy absorbing member 54 taken on an imaginary plane perpendicular to the lengthwise direction of the structural member 50, that is, the plane of the drawing in each of FIGS. 5 through 7, is substantially uniform in shape.

As shown in FIG. 8, the roof side rail 50 is joined at its forward end portion to a header 36 extending in the right-left directions with respect to the vehicle body and to a front pillar 20 extending diagonally upward from a lower position. An intermediate-to-rearward portion of the roof side rail 50 is bent in a convex shape, and also bent in a direction substantially perpendicular to the plane of the drawing in FIG. 8. As a result of the three-dimensionally bent shape of the roof side rail 50, the interval 62 between the inner panel 56 of the roof side rail 50 and the interior trim 52 disposed inward from the inner panel 56 becomes narrowest, as shown in FIG. 5, at a connecting portion 34 where the roof side rail 50, the front pillar 20 and the header 36 are connected. Since the energy absorbing member 54 is formed so as to have a substantially uniform sectional shape over the entire length thereof while the sectional shape thereof conforms to the narrowest interval, the energy absorbing member 54 is contained in the interval 62.

Since the energy absorbing member 54 has a shape as described above, at a site remote from the connecting portion 34, a gap 64 is formed between the energy absorbing member 54 and the interior trim 52 and a gap 66 is formed between the energy absorbing member 54 and the inner panel 56 of the roof side rail 50, as can be seen in FIG. 6. Furthermore, at another site remote from the connecting portion 34, a gap 68 is formed between the energy absorbing member 54 and the inner panel 56 of the roof side rail 50, as shown in FIG. 7. According to the invention, the gaps 64, 66, 68 are filled by disposing spacers 70, 72, 74 therein. The spacers 70, 72, 74 themselves may be capable or incapable of absorbing energy. The spacer 70 extends rearward along the structural member 50 in the direction of its length. The cross section of the spacer 70 gradually reduces toward the rearward end thereof. The spacer 72 extends toward the spacer 74, and has a cross section substantially equal to or slightly larger than that of the spacer 74. The spacer 70 does not need to fill the entire gap. The spacers 72, 74 may be a single continuous spacer or separate spacers. For example, a plurality of spacers may be disposed serially in the lengthwise direction, with intervals left therebetween, as mentioned above. If the inter-spacer interval is sufficiently smaller than the size of a roundish object that impacts the interior trim 52, the presence of the inter-spacer interval in the lengthwise direction does not cause a problem in energy absorption.

Figure 9:
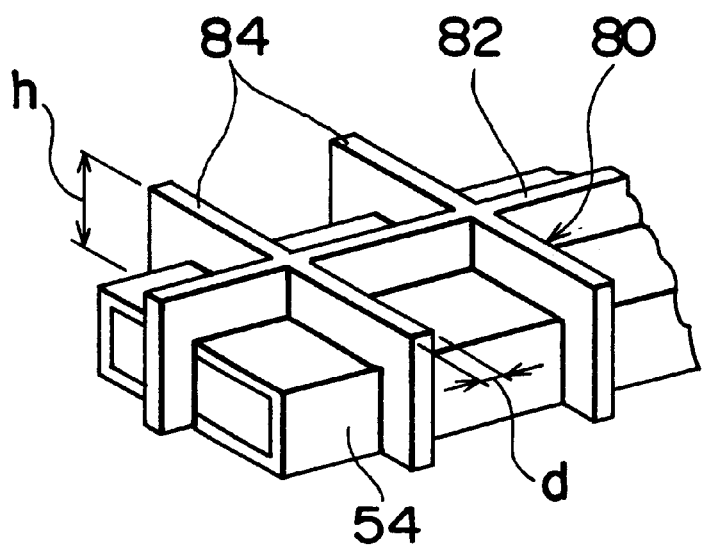
FIG. 9 is a perspective view of a portion of an energy absorbing member.

In a structure in which the spacers 70, 72, 74 are capable of absorbing energy, the spacer 70 may be provided as resin ribs that have been formed on a reverse surface of the interior trim 52 that faces the energy absorbing member 54, integrally with the interior trim 52, as in the above-described embodiment. Furthermore, the spacers 70, 72, 74 may be resin ribs or foamed members that are provided integrally with the energy absorbing member 54 and that are capable of absorbing energy. Referring to the perspective view in FIG. 9, a resin rib member 80 is fitted over an outer periphery of the energy absorbing member 54. The resin rib member 80 has a longitudinal rib 82 and a plurality of lateral ribs 84. The resin rib member 80 is formed separately from the energy absorbing member 54, and then fitted to the energy absorbing member 54 so as to form an integral body. Since the sizes of the gaps 64, 66, 68 are known in a designing stage, the heights h of the longitudinal rib 82 and the lateral ribs 84 are determined so that the resin rib member 80 is contained in the gaps. Furthermore, the plate thickness d of the resin rib member 80 is determined so as to perform suitable energy absorption. Based on these dimensions, the resin rib member 80 is formed. It is also possible to attach a foamed member formed of, for example, urethane foam or the like, to the energy absorbing member 54, instead of providing the resin rib member 80.

Figure 10:
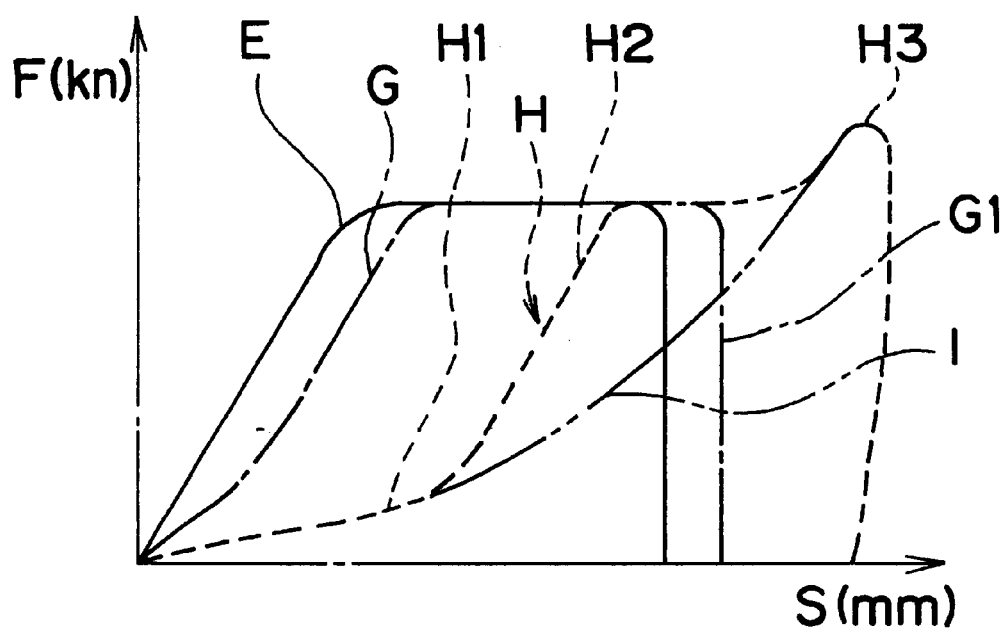
FIG. 10 is a graph indicating load-displacement energy absorption characteristics of the impact energy absorbing structure of FIGS. 5–8, illustrating the operation and advantages of the invention.

FIG. 10 is a graph indicating load(F)-displacement(S) energy absorption characteristics in various cases. If an impact load occurs at a site indicated by the sectional view in FIG. 5, the energy absorbing member 54 starts deforming during an initial period following occurrence of the impact load. Therefore, the reaction load changes as indicated by solid line E. If an impact load occurs at a site indicated by the sectional view in FIG. 6, the start of compression deformation of the energy absorbing member 54 may be slightly delayed by the effect of a small gap that may exist between the spacer 70 and the interior trim 52 or between the spacer 72 and the structural member 50. Therefore, the reaction load changes as indicated by single-dot line G. After the energy absorbing member 54 is sufficiently compressed, the spacer, that is, the resin ribs, shear or buckle, so that the reaction load decreases as indicated by G1. The reaction load changes in a similar pattern if an impact load occurs at a site indicated by the sectional view in FIG. 7. In contrast, if there is no spacer in the gap at the site indicated by the sectional view of FIG. 6, the reaction load changes as indicated by broken line H. That is, the reaction load remains small as indicated by H1 until the interior trim 52 contacts the energy absorbing member 54. When the interior trim 52 contacts the energy absorbing member 54 and the energy absorbing member 54 starts to undergo compression deformation, the reaction load increases as indicated by H2, resulting in a bottoming phenomenon as indicated by H3. If the energy absorbing member 54 is a metal pipe, the reaction load rises as indicated by E, G or H when the energy absorbing member 54 is compressed. If the energy absorbing member and the spacers provided at the site indicated by FIG. 6 are all made of resin, the reaction load rises gently as indicated by I.

Figure 11:
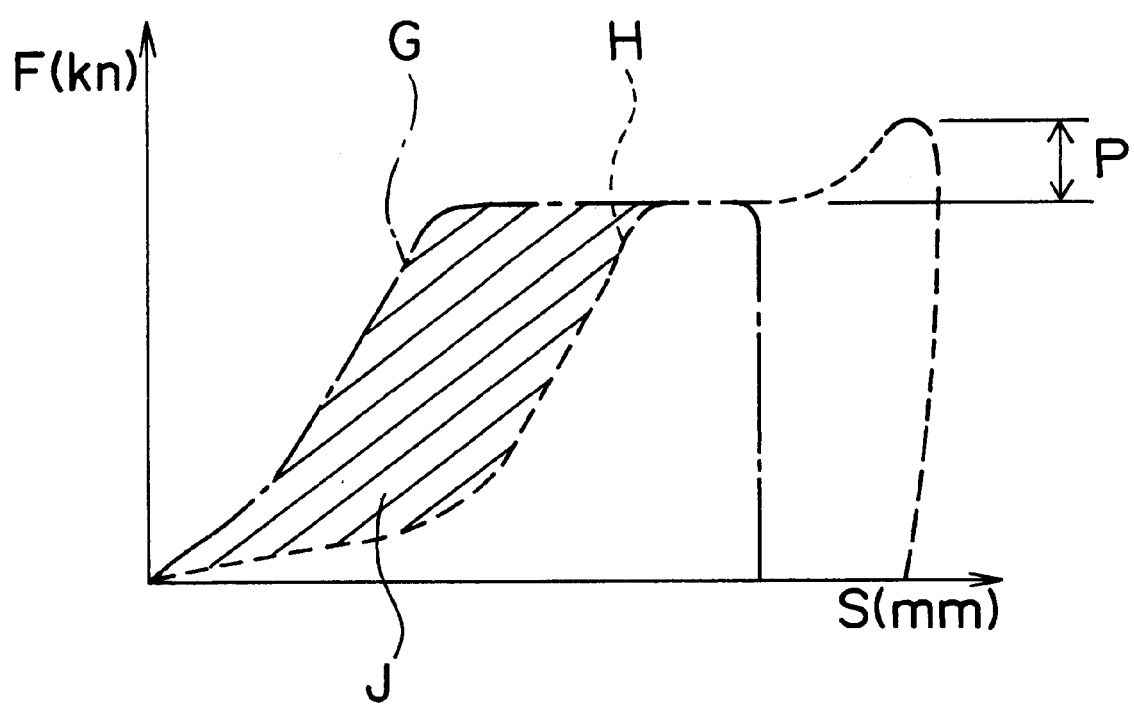
FIG. 11 is another graph indicating load-displacement energy absorption characteristics of the impact energy absorbing structure of FIGS. 5–8, illustrating the operation and advantages of the invention.

FIG. 11 is a graph indicating load(F)-displacement(S) energy absorption characteristics. If an impact load occurs at the site indicated by the sectional view in FIG. 6, a structure provided with spacers 70, 72 exhibits an energy absorption characteristic indicated by single-dot line G, whereas a structure not provided with a spacer exhibits an energy absorption characteristic indicated by broken line H. Therefore, an amount of energy corresponding to the area J indicated by hatching can be additionally absorbed by disposing the spacers 70, 72. The energy absorbing efficiency can thus be increased. Furthermore, the provision of the spacers 70, 72 reduces the peak value of reaction load by a difference P between the two peaks indicated in FIG. 11.

Figure 12:
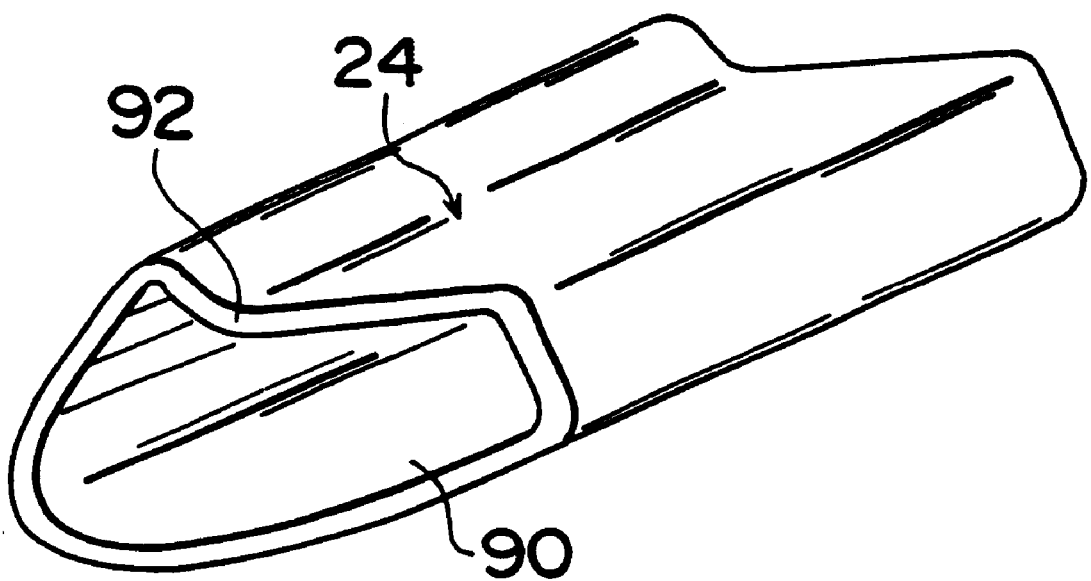
FIG. 12 is a perspective view of a metal pipe that can be employed in an impact energy absorbing structure in an upper vehicle body portion according to the invention.

The above-described energy absorbing member 24 may be a metal pipe formed by extrusion as shown in the perspective view in FIG. 12. The metal pipe may be formed from aluminum or an aluminum alloy so as to have a predetermined hollow section 90 and a predetermined shape 92. The energy absorbing member 54 may also be a metal pipe similarly formed by extrusion.

Figure 13:
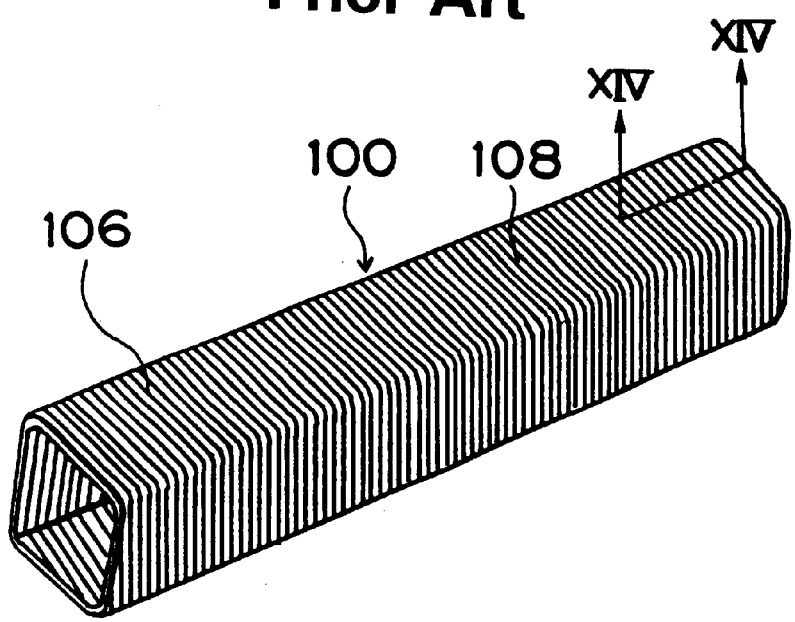
FIG. 13 is a perspective view of a hybrid pipe that can be employed in an impact energy absorbing structure in an upper vehicle body portion according to the invention.
Figure 14:
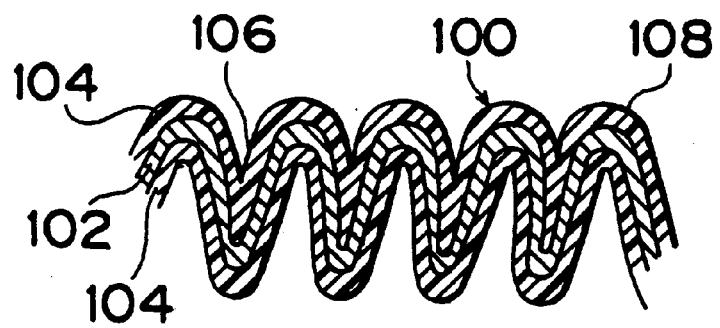
FIG. 14 is a partially enlarged sectional view of taken on line XIV—XIV in FIG. 13.

The energy absorbing members 24, 54 may also be a hybrid pipe 100 as shown in the perspective view in FIG. 13 and the sectional view in FIG. 14. The hybrid pipe 100 is made up of a metal foil core member 102 and sheets 104 laminated on and fixed to opposite surfaces of the core member 102, the sheets 104 being formed from a material other than metal. The composite of the core member 102 and the sheets 104 is shaped or deformed so as to have protruded portions (ridges) 108 and recessed portions (grooves) 106 that are contiguous in the direction of a longitudinal axis of the hybrid pipe 100. The material of the core member 102 may be selected from a hard aluminum foil, a hard stainless steel foil, or a hard magnesium alloy foil. The sheets 104 are made of kraft paper or resin. The core member 102 has a plate thickness of at least 0.05 mm and a width of at least 30 mm. The sheets 104 have a plate thickness of at least 0.2 mm and a width of at least 30 mm. In the hybrid pipe shown in FIG. 13, the protruded and recessed portions extend helically. Instead of such a helical configuration, it is also possible to adopt a looped configuration in which a recessed portion 106 extends around the periphery of the pipe and forms a complete loop and, respectively adjacent to either side of the recessed portion 106, two independent protruded portions 108 extend around the periphery of the pipe and form complete loops.

An impact energy absorbing component may be formed by using an energy absorbing member wherein the shapes of sections taken on planes perpendicular to the longitudinal axis of the member are substantially uniform in the direction of the longitudinal axis, and a spacer disposed at a predetermined position on the energy absorbing member. More specifically, an impact energy absorbing component having characteristics as indicated by B and C in FIG. 4 can be formed by using the energy absorbing member 24 and the spacer 42 shown in FIGS. 1 and 2. Furthermore, an impact energy absorbing component having characteristics as indicated by E and G in FIG. 10 can be formed by using the energy absorbing member 54 and the spacers 70, 72, 74 shown in FIGS. 5 through 7. The energy absorbing member used may be an extruded metal pipe as shown in FIG. 12, a hybrid pipe as shown in FIG. 13, or the like.

The perspective views in FIGS. 15 through 19 show other embodiments of the impact energy absorbing structure formed in an upper vehicle body portion for absorbing impact energy, the structure including a vehicle body structural member extending in a lengthwise direction, an interior trim spaced inward from the structural member, and energy absorbing member disposed in an interval between the structural member and the interior trim and extending along the structural member in the lengthwise direction.

In these embodiments, the energy absorbing member is formed by a hybrid pipe as shown in FIGS. 13 and 14 that is made up of a metal foil-made core member, and sheets laminated on opposite surfaces of the core member. Each sheet is formed from a material other than metal. A composite of the core member and the sheets is corrugated continually in a direction of a longitudinal axis of the pipe. The hybrid pipe is formed so that the length of the outer periphery of a section taken on a plane perpendicular to the axis of the pipe is substantially consistent in the direction of the longitudinal axis, while the sectional shape gradually changes in the direction of the longitudinal axis.

Figure 15:
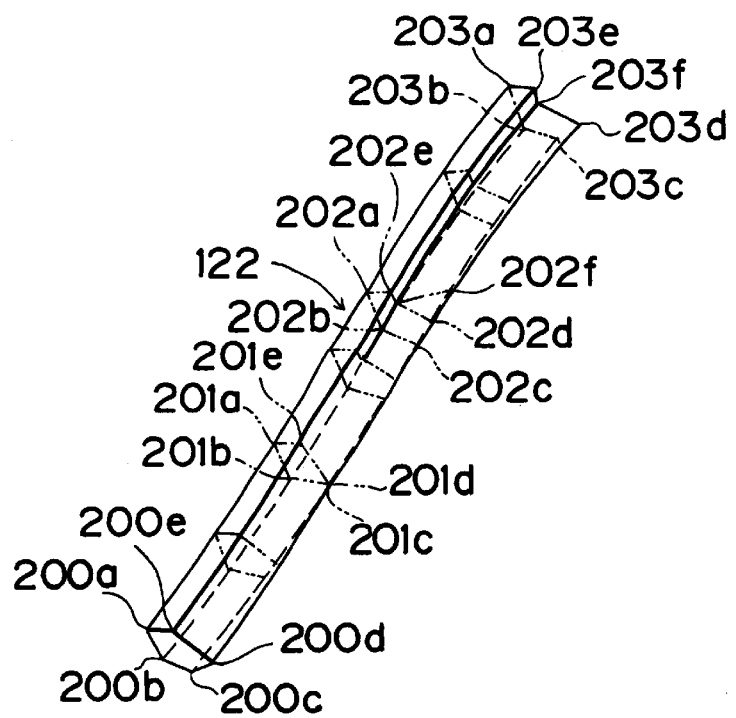
FIG. 15 is a perspective view of a hybrid pipe that is used in an impact energy absorbing structure in an upper vehicle body portion according to the invention, the hybrid pipe being provided for a front pillar.
Figure 19:
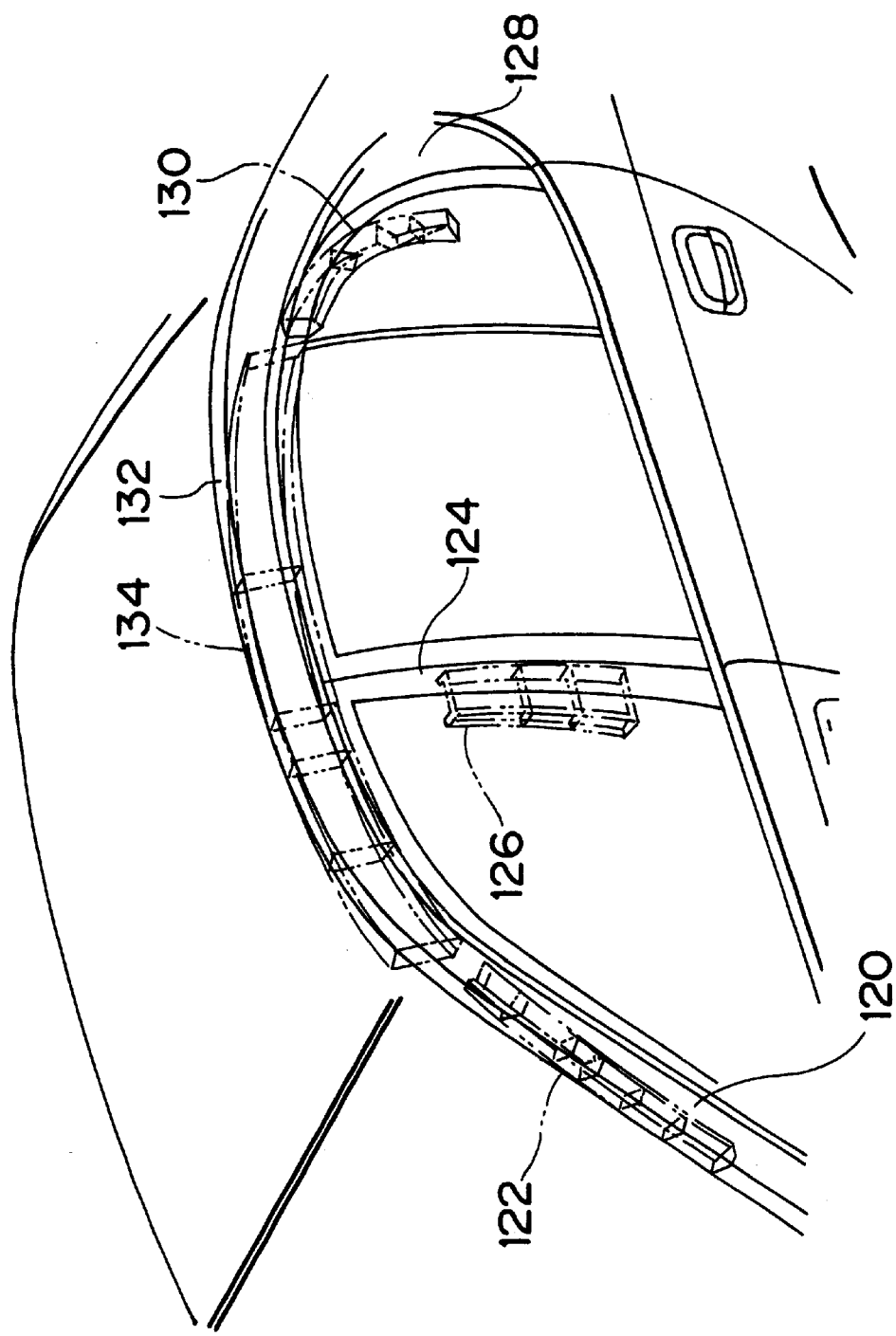
FIG. 19 is a perspective view of a vehicle body to which an impact energy absorbing structure in an upper vehicle body portion according to the invention can be applied.

FIG. 15 shows an energy absorbing member 122 for a front pillar 120 (shown in FIG. 19). The energy absorbing member 122 has a pentagonal sectional shape indicated by 200a, 200b, 200c, 200d, 200e at a lower end thereof, and a pentagonal sectional shape 201a, 201b, 201c, 201d, 202e resembling a quadrangle at an intermediate site, that is, a site upward from the lower end. Furthermore, the energy absorbing member 122 has a hexagonal sectional shape 202a, 202b, 202c, 202d, 202e, 202f at a further upward intermediate site, and a hexagonal sectional shape 203a, 203b, 203c, 203d, 203e, 203f at an upper end.

Figure 16:
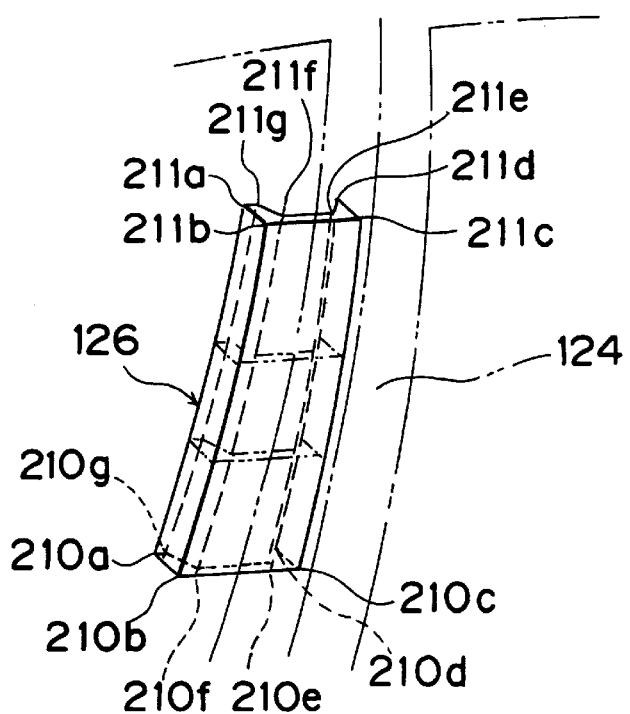
FIG. 16 is a perspective view of a hybrid pipe that is used in an impact energy absorbing structure in an upper vehicle body portion according to the invention, the hybrid pipe being provided for a center pillar.

FIG. 16 shows an energy absorbing member 126 for a center pillar 124. The energy absorbing member 126 has a heptagonal sectional shape 210a, 210b, 210c, 210d, 210e, 210f, 210g forming a generally squared "U" shape at a lower end of the member 126, and a heptagonal sectional shape at an intermediate site in the member 126 which resembles in shape but differs in side measurements from the heptagonal sectional shape at the lower end. Furthermore, the energy absorbing member 126 has a heptagonal sectional shape 211a, 211b, 211c, 211d, 211e, 211f, 211g at an upper end, which also has a generally squared "U" shape but has different side measurements.

Figure 17:
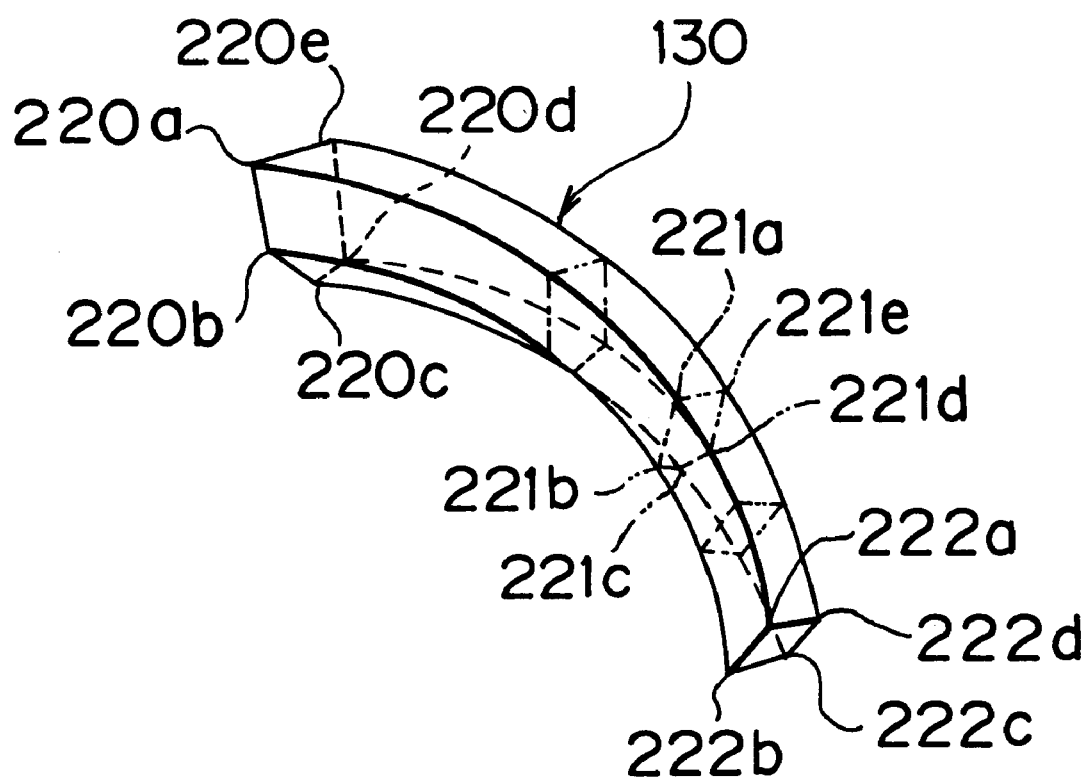
FIG. 17 is a perspective view of a hybrid pipe that is used in an impact energy absorbing structure in an upper vehicle body portion according to the invention, the hybrid pipe being provided for a quarter pillar.

FIG. 17 shows an energy absorbing member 130 for a quarter pillar 128 (shown in FIG. 19). The energy absorbing member 130 has a pentagonal sectional shape 220a, 220b, 220c, 220d, 220e at an upper end thereof, and a pentagonal sectional shape 221a, 221b, 221c, 221d, 221e at an intermediate site in the member 130 which resembles in shape but differs in side measurements from the pentagonal sectional shape at the upper end. Furthermore, the member 130 has a quadrangular sectional shape 222a, 222b, 222c, 222d at a lower end.

Figure 18:
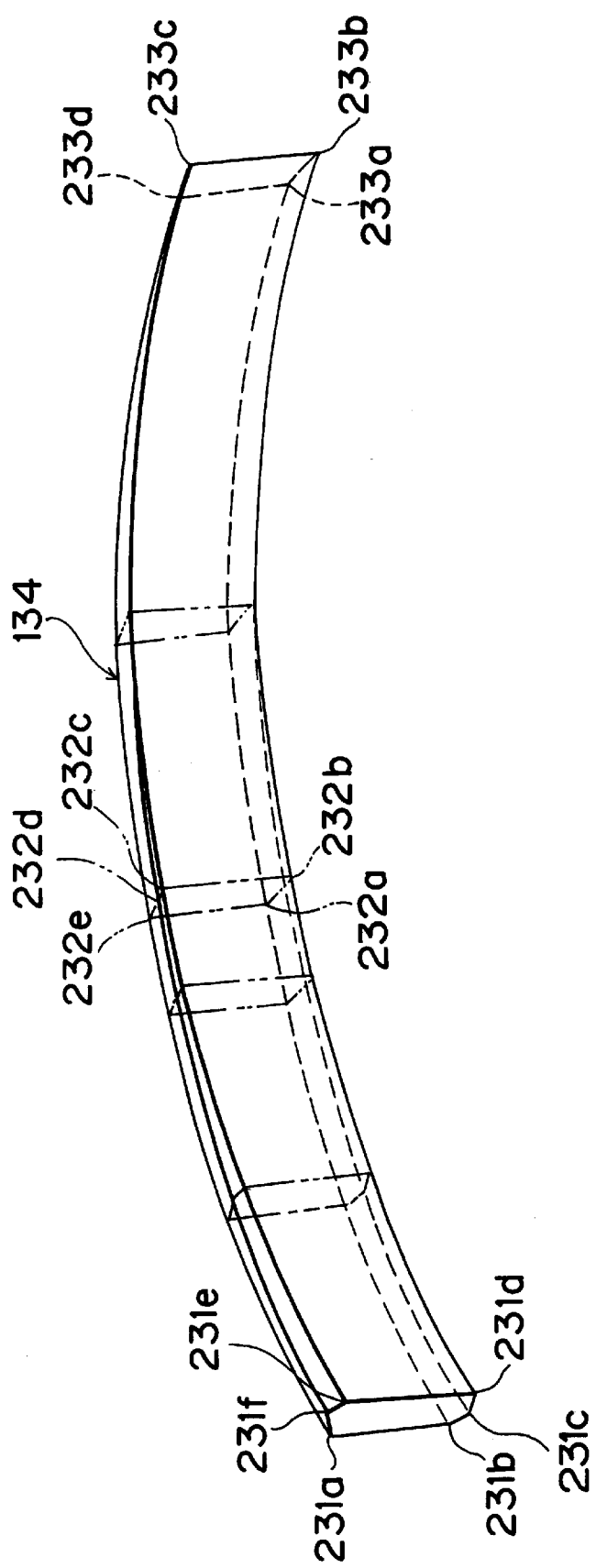
FIG. 18 is a perspective view of a hybrid pipe that is used in an impact energy absorbing structure in an upper vehicle body portion according to the invention, the hybrid pipe being provided for a roof side rail.

FIG. 18 shows an energy absorbing member 134 for a roof side rail 132 (shown in FIG. 19). The energy absorbing member 134 has a hexagonal sectional shape 231a, 231b, 231c, 231d, 231e, 231f at a forward end thereof, a pentagonal sectional shape 232a, 232b, 232c, 232d, 232e at an intermediate site, and a quadrangular sectional shape 233a, 233b, 233c, 233d at a rearward end.

Each of the energy absorbing members 122, 126, 130, 134 shown in FIGS. 15 through 18 is formed so that the length of the outer periphery of a section taken on a plane perpendicular to the longitudinal axis of the member is substantially consistent in the direction of the longitudinal axis, while the sectional shape gradually changes in the direction of the longitudinal axis. Each member can be formed by preparing a cylindrical hybrid pipe, shaping it into a quadrangular-prism hybrid pipe as shown in FIG. 13, and then subjecting the pipe to a forming process whereby the cross sectional shape is gradually changed in the direction of the longitudinal axis of the pipe.

Figure 20:
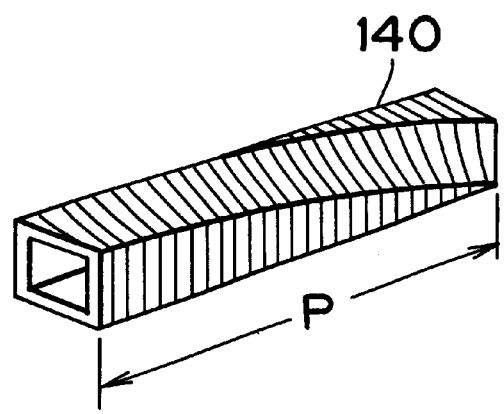
FIG. 20 is a perspective view of a twisted portion of a hybrid pipe that can be employed in an impact energy absorbing structure in an upper vehicle body portion according to the invention.

As shown in the perspective view in FIG. 20, a hybrid pipe 140 whose cross sectional shape changes in the direction of the longitudinal axis thereof may have a configuration that is twisted about the longitudinal axis. The hybrid pipe 140 has a twist pitch P. The twist pitch P is defined as a distance between two end faces that form therebetween a predetermined twist angle (twisted angle of one end face with respect to the other). In the hybrid pipe 140 shown in FIG. 20, the twist pitch P is equal to the entire length of the pipe. As the twist pitch P is decreased, the amount of twist per unit length increases. By changing the twist pitch P, the energy absorption characteristics can be adjusted.

Figure 21:
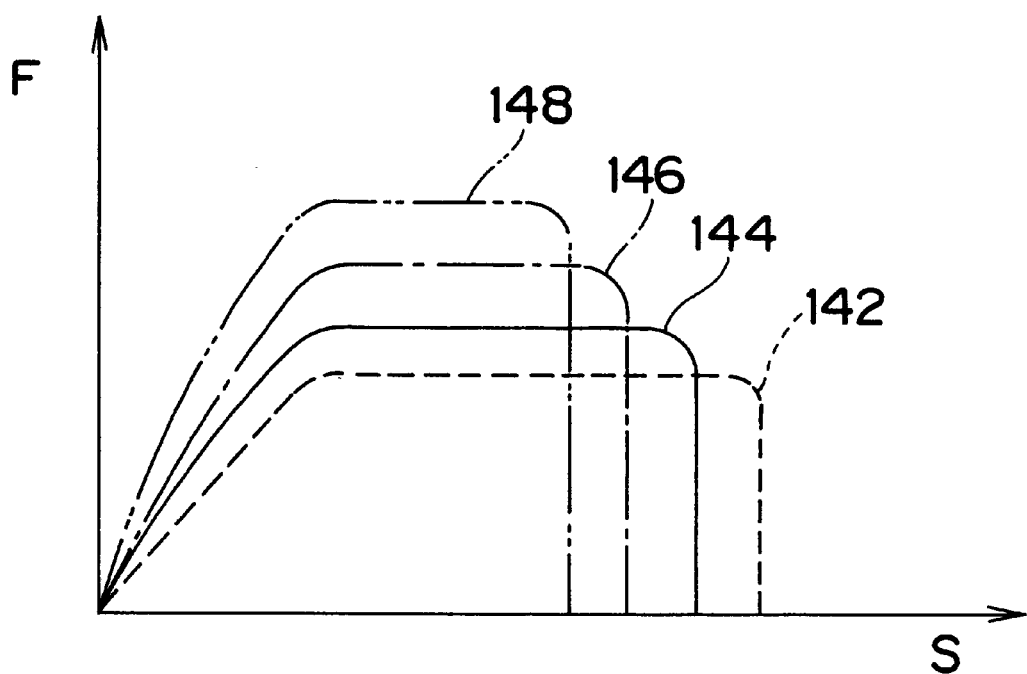
FIG. 21 is a graph indicating load-displacement energy absorption characteristics of impact absorbing structures having mutually different degrees of twist.

FIG. 21 is a graph indicating load(F)-displacement(S) energy absorption characteristics. As indicated, the rising of load is sharper in twisted pipes 144, 146, 148 than in an untwisted pipe 142. The twist pitch P decreases in the order of the pipe 144, the pipe 146 and the pipe 148. It can be seen from the graph that as the twist pitch P decreases, that is, as the amount of twist per unit length increases, the rising of load becomes sharper and the displacement decreases.

Figure 22:
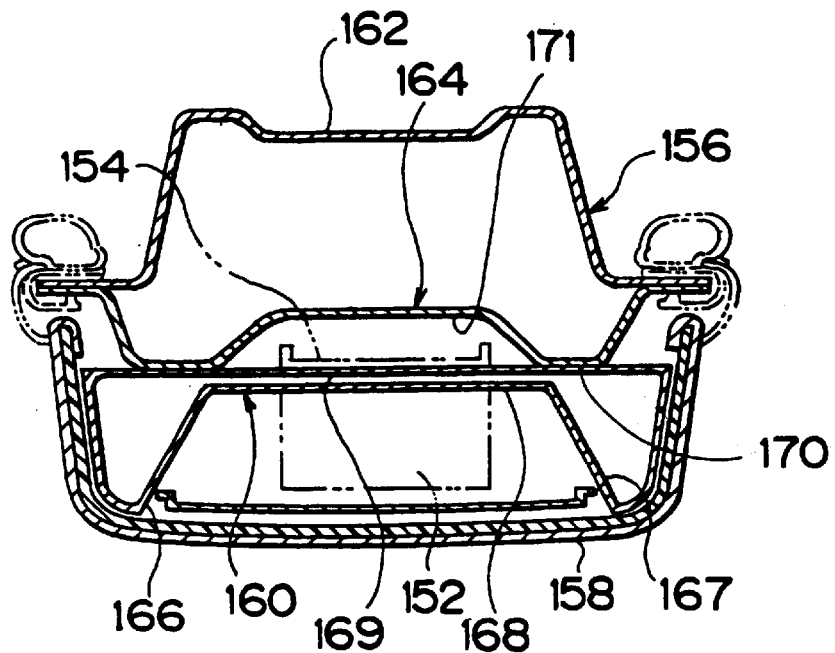
FIG. 22 is a horizontal sectional view of a center pillar where the hybrid pipe shown in FIG. 16 is mounted.
Figure 23:
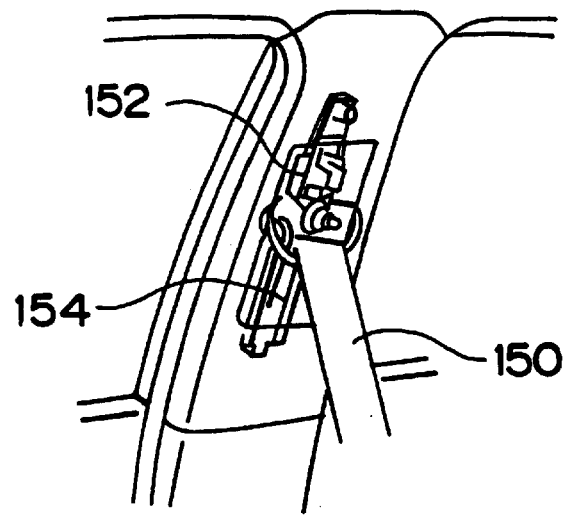
FIG. 23 is a perspective view showing a belt adjuster support and a belt, where an energy absorbing member is omitted from the illustration.

FIG. 22 is a sectional view illustrating in detail the structure shown in FIG. 16. FIG. 23 is a perspective view showing a belt adjuster support and a belt. An impact energy absorbing structure provided in an upper vehicle body portion shown in FIGS. 22 and 23 includes a center pillar 156, a pillar garnish 158 spaced inward from the center pillar 156, and an energy absorbing member 160 disposed in an interval between the center pillar 156 and the pillar garnish 158 and extending in an up-down direction along the center pillar 156. A rail 154 vertically movably supporting an adjuster support 152 for a shoulder belt 150 incorporated in the seat belt assembly is mounted to an intermediate portion of the center pillar 156 in the front-rear direction relative to the vehicle body. The adjuster support 152 and the rail 154 are known members that allow a user to move the adjuster support 152 up or down while pressing an adjuster button (not shown) so as to set the seat belt 150 to a proper position. The energy absorbing member 160 has substantially the same shape as that of the energy absorbing member 126 shown in FIG. 16.

The center pillar 156 is made up of an outer panel 162 and an inner panel 164. Flanges of the panels are joined so that the center pillar 156 has a closed sectional shape taken on a horizontal plane.

The energy absorbing member 160 is a hybrid pipe having a pair of energy absorbing hollow portions 166, 167. The energy absorbing hollow portions 166, 167 are connected to each other and disposed forward and rearward of the rail 154. The energy absorbing member 160 has substantially the same configuration as that of the energy absorbing member 126 shown in FIG. 16. The energy absorbing hollow portions 166, 167 are interconnected via connecting portions 168, 169 that define a narrow hollow therebetween. The energy absorbing hollow portion 166 is disposed forward of the rail 154, and the energy absorbing hollow portion 167 is disposed rearward of the rail 154.

The inner panel 164 of the center pillar 156 has a recess 171 for housing the rail 154. The recess 171 is recessed from a general surface 170 of the inner panel 164. The connecting portion 169 of the energy absorbing member 160 is placed in contact with the up-down extending general surfaces 170, and apart from the recess 171. The energy absorbing member 160 may be mounted to the center pillar 156 by screwing tapping screws into the connecting portions 168, 169 of the energy absorbing member 160 and the general surfaces 170 of the inner panel 164 of the center pillar 156. The energy absorbing member 160 may alternatively be mounted to the pillar garnish 158.

Each of the energy absorbing members 122, 126, 130, 134, 140, 160 shown collectively in FIGS. 15 through 22 can be used alone as an impact energy absorbing component. By disposing and mounting such an impact energy absorbing component at a predetermined position, an impact energy absorbing structure can be formed.

While the present invention has been described with reference to what are presently considered to be preferred embodiments thereof, it is to be understood that the invention is not limited to the disclosed embodiments or constructions. To the contrary, the invention is intended to cover various modifications and equivalent arrangements.

What is claimed is:

1. An impact energy absorbing structure in an upper vehicle body portion, comprising:

a vehicle body structural member;

an interior trim spaced from the structural member by an interval extending inwardly from the structural member; and an energy absorbing member disposed in the interval between the interior trim and the structural member and extending along the structural member;

wherein the energy absorbing member is a hybrid pipe comprising a core member formed from a metal foil, and sheets laminated on opposite surfaces of the core member, each of the sheets being formed from a material other than metal, the core member and the sheets being shaped so that the hybrid pipe has protruded portions and recessed portions that are contiguous in a direction of a longitudinal axis of the hybrid pipe; and wherein the hybrid pipe is formed so that a length of an outer periphery of a section of the hybrid pipe taken on an imaginary plane perpendicular to the longitudinal axis of the hybrid pipe is substantially consistent in the direction of the longitudinal axis, the hybrid pipe having a portion in which a shape of the section of the hybrid pipe gradually changes in the direction of the longitudinal axis, and the hybrid pipe being twisted about the longitudinal axis.

2. An impact energy absorbing structure in an upper vehicle body portion, comprising:

a vehicle body structural member;

an interior trim spaced from the structural member by an interval extending inwardly from the structural member; and an energy absorbing member disposed in the interval between the interior trim and the structural member and extending along the structural member;

wherein the energy absorbing member is a hybrid pipe comprising a core member formed from a metal foil, and sheets laminated on opposite surfaces of the core member, each of the sheets being formed from a material other than metal, the core member and the sheets being shaped so that the hybrid pipe has protruded portions and recessed portions that are contiguous in a direction of a longitudinal axis of the hybrid pipe and;

wherein the hybrid pipe is formed so that a length of an outer periphery of a section of the hybrid pipe taken on an imaginary plane perpendicular to the longitudinal axis of the hybrid pipe is substantially consistent in the direction of the longitudinal axis, the hybrid pipe having a portion in which a shape of the section of the hybrid pipe gradually changes in the direction of the longitudinal axis, according to the shape of the interval between the vehicle body structural member and the interior trim.

3. An impact energy absorbing structure according to claim 2, wherein the vehicle body structural member comprises at least one of a pillar, a roof side rail, and a header of a vehicle.

4. An impact energy absorbing component, comprising:

a hybrid pipe comprising:

a core member formed from a metal foil; and sheets laminated on opposite surfaces of the core member, each of the sheets being formed from a material other than metal, the core member and the sheets being shaped so that the hybrid pipe has protruded portions and recessed portions that are contiguous in a direction of a longitudinal axis of the hybrid pipe; and wherein the hybrid pipe is formed so that a length of an outer periphery of a section of the hybrid pipe taken on an imaginary plane perpendicular to the longitudinal axis of the hybrid pipe is substantially consistent in the direction of the longitudinal axis, the hybrid pipe having a portion in which a shape of the section of the hybrid pipe gradually changes in the direction of the longitudinal axis, according to a shape of an interval formed between a vehicle body structural member of a vehicle and an interior trim of the vehicle.

* * * * *